US012584477B2

(12) United States Patent
Zuo et al.

(10) Patent No.: US 12,584,477 B2
(45) Date of Patent: Mar. 24, 2026

(54) PACKING LEAKAGE DETECTION SYSTEM AND METHOD

(71) Applicant: YANTAI JEREH OILFIELD SERVICES GROUP CO., LTD., Yantai (CN)

(72) Inventors: Wenlong Zuo, Yantai (CN); Yibo Jiang, Yantai (CN); Hailong Li, Yantai (CN); Guoqing Zhang, Yantai (CN)

(73) Assignee: Yantai Jereh Oilfield Services Group Co., Ltd., Yantai (CN)

( * ) Notice: Subject to any disclaimer, the term of this patent is extended or adjusted under 35 U.S.C. 154(b) by 0 days.

(21) Appl. No.: 18/639,703

(22) Filed: Apr. 18, 2024

(65) Prior Publication Data

US 2024/0263630 A1 Aug. 8, 2024

Related U.S. Application Data

(63) Continuation of application No. PCT/CN2021/142529, filed on Dec. 29, 2021.

(30) Foreign Application Priority Data

Nov. 29, 2021 (CN) .......................... 202111437307.4

(51) Int. Cl.
*F04B 51/00* (2006.01)
*F04B 53/18* (2006.01)
(Continued)

(52) U.S. Cl.
CPC .............. *F04B 51/00* (2013.01); *F04B 53/18* (2013.01); *F16N 29/02* (2013.01); *G01M 3/26* (2013.01); *F16N 2250/06* (2013.01)

(58) Field of Classification Search
CPC .......... F04B 51/00; F04B 53/18; F16N 29/02; F16N 2250/06; G01M 3/26
See application file for complete search history.

(56) References Cited

U.S. PATENT DOCUMENTS 3,914,752 A 10/1975 Howard et al.

FOREIGN PATENT DOCUMENTS

CN 208473757 U 2/2019
CN 208934896 U 6/2019
(Continued)

OTHER PUBLICATIONS

International Search Report mailed Jun. 27, 2022 for International Application No. PCT/CN2021/142529, including English translation.
(Continued)

*Primary Examiner* — Audrey B. Walter
(74) *Attorney, Agent, or Firm* — Crowell & Moring LLP

(57) ABSTRACT

This application relates to the field of oil and gas devices, systems, and methods, and particularly relates to a packing leakage detection system and method. The packing leakage detection system includes a plunger pump, a pressure sensor and a control system, where the pressure sensor is configured to detect a pressure value inside a hydraulic end of the plunger pump, and send the detected pressure value to the control system; and the control system is configured to acquire the pressure value sent by the pressure sensor, and send prompt information according to the pressure value, where the prompt information includes at least one of alarm information and information for prompting shutdown and overhaul. This application is used for solving the problem that a leakage anomaly caused by a packing failure is not discovered in time.

10 Claims, 4 Drawing Sheets

(51) Int. Cl.
 *F16N 29/02* (2006.01)
 *G01M 3/26* (2006.01)

(56) References Cited

FOREIGN PATENT DOCUMENTS

| | | | |
|----|--------------|-----|--------|
| CN | 111498780 A  |     | 8/2020 |
| CN | 113153727 A  | *   | 7/2021 |
| CN | 213627511 U  | *   | 7/2021 |
| CN | 113701956 A  |     | 11/2021 |

OTHER PUBLICATIONS

Written Opinion mailed Jun. 27, 2022 for International Application No. PCT/CN2021/142529, including English translation.

* cited by examiner

PACKING LEAKAGE DETECTION SYSTEM AND METHOD

CROSS-REFERENCE TO RELATED APPLICATIONS

This application is continuation application and claims the benefit of priority to PCT International Application No. PCT/CN2021/142529, filed on Dec. 29, 2021, which is based on and claims priority to Chinese Patent Application No. 202111437307.4, entitled "PACKING LEAKAGE DETECTION SYSTEM AND METHOD" and filed with the China National Intellectual Property Administration on Nov. 29, 2021. Both of these prior patent applications are incorporated herein by reference in their entireties.

TECHNICAL FIELD

This application relates generally to the field of oil and gas devices, and particularly to a packing leakage detection system and method.

BACKGROUND

With the continuous development of the petroleum industry, plunger pumps are increasingly widely used in oilfield wellsite operations. For example, high-pressure plunger pumps are employed during fracturing and oilfield water injection operations. Fracturing involves injecting high displacement fracturing fluid into a well, causing artificial fractures in water and oil layers, and then injecting propping agents to increase the yield. Because oil wells exploited over a long time may experience stoppages and residual dead oil, resulting in difficulties in further exploitation, water injection may become necessary in order to increase the pressure of the oil layer to continue operations.

A plunger pump is may include a power end and a hydraulic end, the power end may be implemented as a crank slider worm gear type or a planetary gear transmission type according to different forms of motion mechanisms, and the power end drives a spindle to perform a rotary motion which is then converted into a reciprocating motion of a plunger. Through the reciprocating motion of the plunger, the plunger pump converts a low-pressure mixed solution entering from a liquid inlet end into a high-pressure mixed solution to be discharged. In this process, a packing and a plunger connecting rod are dynamically sealed, and the sealing is achieved by virtue of radial expansion of the packing. A long-term circulation and repetition of low pressure and high pressure causes distortion, damage and other phenomena of the packing, thus may seriously affect the operating efficiency and even cause accidents.

SUMMARY

This application provides a packing leakage detection system and method to solve the problem of delayed detection/warning of abnormal packing leakage or other failures.

According to a first aspect, an embodiment of this application provides a packing leakage detection system, including a plunger pump, a pressure sensor and a control system, where the pressure sensor is configured to detect a pressure value inside a hydraulic end of the plunger pump, and send the detected pressure value to the control system; and the control system is configured to acquire the pressure value sent by the pressure sensor, and send prompt information according to the pressure value, where the prompt information includes at least one of alarm information and information for prompting shutdown and overhaul.

Optionally, the pressure sensor is arranged within a preset area where the distance from a grease injection hole is less than a preset distance value, where the grease injection hole is located on a housing of the hydraulic end, and the grease injection hole is configured to connect an automatic lubrication system.

Optionally, the packing leakage detection system further includes a one-way valve, a three-way joint and a straight joint; and an input end of the grease injection hole is connected to the automatic lubrication system, an output end of the grease injection hole is connected to a first end of the one-way valve, a second end of the one-way valve is connected to a first end of the three-way joint, a second end of the three-way joint is connected to a first end of the pressure sensor, a second end of the pressure sensor is connected to the control system, a third end of the three-way joint is connected to a first end of the straight joint, and a second end of the straight joint is connected to a packing component of the hydraulic end.

Optionally, a connecting hole is arranged in a circumferential position of the grease injection hole, and the pressure sensor is arranged on the connecting hole.

Optionally, at least one grease injection hole is provided, and at least one pressure sensor is provided.

Optionally, the control system is specifically configured to judge whether the pressure value is greater than a preset pressure value, and send the prompt information in a case that the pressure value is greater than the preset pressure value.

According to a second aspect, an embodiment of this application provides a packing leakage detection method, including: acquiring a pressure value inside a hydraulic end of a plunger pump; and sending prompt information according to the pressure value, where the prompt information includes at least one of alarm information and information for prompting shutdown and overhaul.

Optionally, the sending prompt information according to the pressure value includes: judging whether the pressure value is greater than a preset pressure value; and sending the prompt information in a case that the pressure value is greater than the preset pressure value.

Optionally, after the acquiring a pressure value inside a hydraulic end of a plunger pump, the method further includes: recording the pressure value.

Optionally, after the recording the pressure value, the method further includes: displaying the pressure value.

According to a third aspect, an embodiment of this application provides a packing leakage detection apparatus, including: an acquisition module, configured to acquire a pressure value inside a hydraulic end of a plunger pump; and a processing module, configured to send prompt information according to the pressure value, where the prompt information includes at least one of alarm information and information for prompting shutdown and overhaul.

Optionally, the processing module includes: a first processing sub-module, configured to judge whether the pressure value is greater than a preset pressure value; and a second processing sub-module, configured to send the prompt information in a case that the pressure value is greater than the preset pressure value.

Optionally, the packing leakage detection apparatus further includes: a recording module, configured to record the pressure value.

Optionally, the packing leakage detection apparatus further includes: a display module, configured to display the pressure value.

According to a fourth aspect, an embodiment of this application provides an electronic device, including: a processor, a memory and a communication bus, where the processor and the memory communicate with each other through the communication bus; the memory is configured to store a computer program; and the processor is configured to execute the program stored in the memory to implement the packing leakage detection method according to the second aspect.

According to a fifth aspect, an embodiment of this application provides a computer-readable storage medium storing a computer program, and the computer program, when executed by a processor, implements the packing leakage detection method according to the second aspect.

Compared with the prior art, the technical solutions provided in the embodiments of this application have the following advantages: in the embodiments of this application, a packing leakage detection system is provided, including the plunger pump, the pressure sensor and the control system, where the pressure sensor is configured to detect a pressure value inside a hydraulic end of the plunger pump, and send the detected pressure value to the control system; and the control system is configured to acquire the pressure value sent by the pressure sensor, and send prompt information according to the pressure value, where the prompt information includes at least one of alarm information and information for prompting shutdown and overhaul. In this application, the pressure value inside the hydraulic end of the plunger pump is detected through the pressure sensor, the pressure value can reflect a leakage anomaly caused by a packing failure in time, and the prompt information is sent according to the pressure value through the control system to prompt a user of the leakage anomaly caused by the packing failure in time to overhaul in time, thus avoiding major safety accidents and effectively preventing a valve box from being damaged due to leakage to solve the problem of delayed detection/warning of abnormal packing leakage or other failures.

BRIEF DESCRIPTION OF THE DRAWINGS

Accompanying drawings herein are incorporated into the specification and constitute a part of the specification, show embodiments that conform to the present invention, and are used for explaining the principle of the present invention together with the specification.

In order to more clearly illustrate the technical solutions in the embodiments of the present invention or in the prior art, the accompanying drawings are briefly introduced below. A person of ordinary skill in the art can derive other accompanying drawings from these accompanying drawings without creative efforts.

Figure 1:
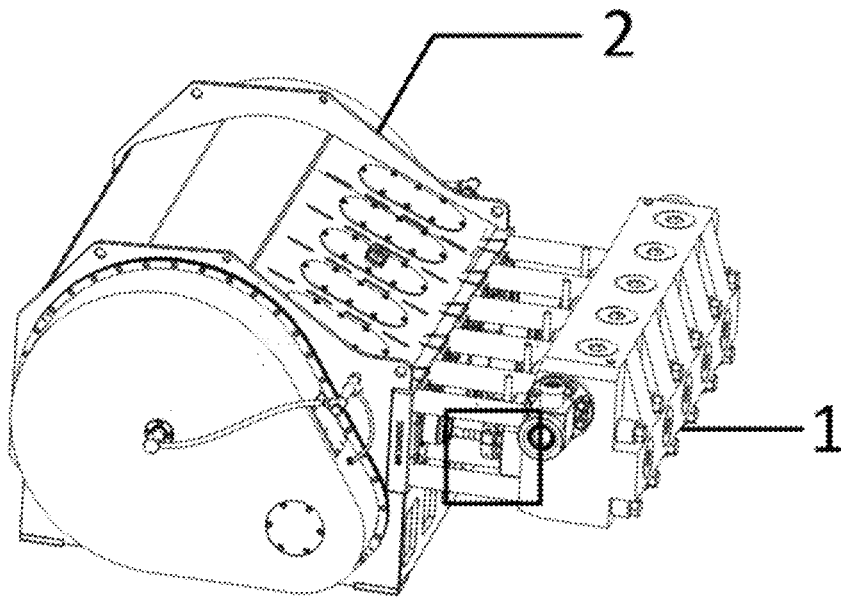
FIG. 1 is a schematic structural diagram of a plunger pump in the prior art.

Description of reference numerals: 1—hydraulic end assembly, 2—power end assembly, 3—plunger pump, 4—pressure sensor, 5—control system, 6—lubrication grease injection hole, 7—automatic lubrication system, 8—one-way valve, 9—three-way joint, 10—straight joint, 11—packing component, 12—plunger, 13—cable (e.g., electric cable for transmitting sensor signal), and 14—packing gland nut.

DETAILED DESCRIPTION

In order to make the objectives, technical solutions and advantages of the embodiments of this application clearer, the technical solutions in the embodiments of this application will be described below with reference to the accompanying drawings in the embodiments of this application. Apparently, the described embodiments are merely some embodiments of this application rather than all of the embodiments. All other embodiments obtained by a person of ordinary skill in the art based on the embodiments of this application without creative efforts shall fall within the scope of protection of this application.

Figure 2:
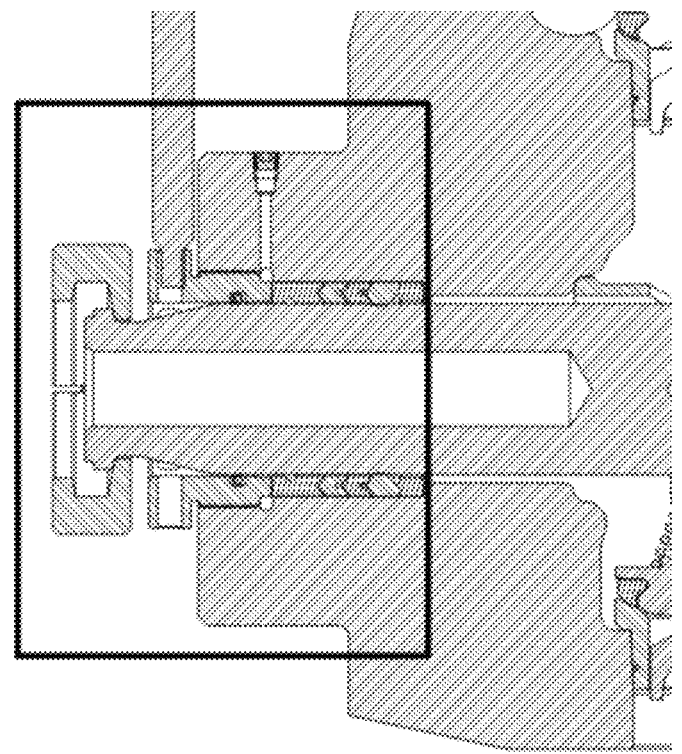
FIG. 2 is a schematic structural diagram of a packing in the plunger pump in the prior art.

By analyzing a plunger pump in the prior art, the inventors found that: FIG. 1 shows a schematic structural diagram of a plunger pump, the plunger pump includes a hydraulic end assembly 1 and a power end assembly 2, the power end assembly 2 provides power to the hydraulic end assembly 1, the hydraulic end assembly 1 is responsible for pressurizing and then discharging a mixed solution composed of sand and other liquids, and a packing assembly is a component in the hydraulic end assembly 1, which performs the functions of wear reduction, sealing and leakage prevention. In FIG. 2, a schematic structural diagram of a packing in the plunger pump is shown in a rectangular box. FIG. 2 corresponds to the rectangular box indicated in FIG. 1.

Figure 3:
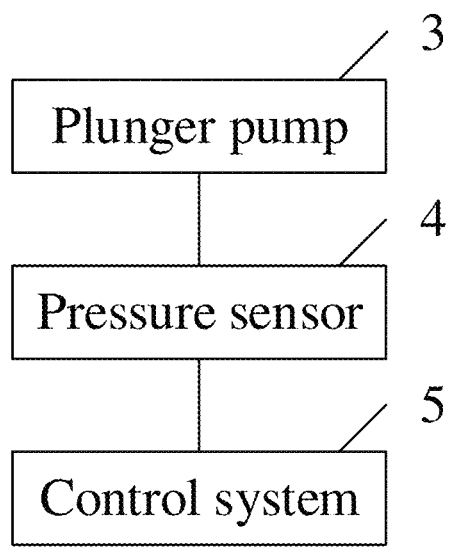
FIG. 3 is a schematic structural diagram of a packing leakage detection system in an embodiment of this application.

In an embodiment of this application, as shown in FIG. 3, a packing leakage detection system is provided, including a plunger pump 3, a pressure sensor 4 and a control system 5.

The pressure sensor 4 is configured to detect a pressure value inside a hydraulic end of the plunger pump 3, and send the detected pressure value to the control system 5.

The control system 5 is configured to acquire the pressure value sent by the pressure sensor 4, and send prompt information according to the pressure value, where the prompt information includes at least one of alarm information and information for prompting shutdown and overhaul.

In this application, the pressure value inside the hydraulic end of the plunger pump is detected through the pressure sensor, the pressure value can reflect a leakage anomaly caused by a packing failure in time, and the prompt information is sent according to the pressure value through the control system to prompt a user of the leakage anomaly caused by the packing failure in time to stop or overhaul the system in time, thereby avoiding major safety accidents and effectively preventing a valve box (at a fracturing fluid end, as described further below, and labeled as 1 in FIG. 1) for controlling low-pressure and high-pressure fracturing fluid from being damaged due to leakage. The example solution above thus help solve the problem that a leakage anomaly caused by a packing failure is often not discovered in time.

Figure 4:
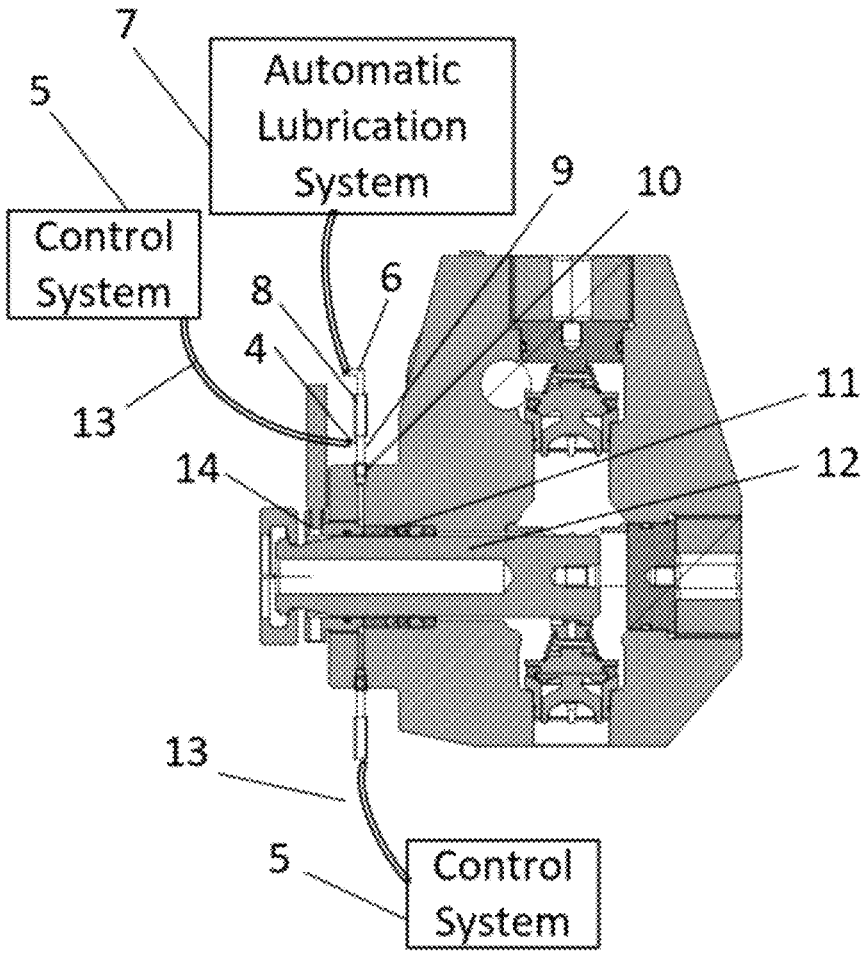
FIG. 4 is a schematic structural diagram of the packing leakage detection system in a specific embodiment of this application.

In a specific embodiment, as shown in FIG. 4, the pressure sensor 4 may be arranged within a preset area where the distance from a grease injection hole 6 is less than a preset distance value. The grease injection hole 6 may be located on a housing of the hydraulic end, and the grease injection hole 6 may be configured to connect to an automatic lubrication system 7. The term "grease" is used to refer to, for example, lubrication grease or lubrication oil, that may be applied to the plunger (12 of FIG. 4) for lubrication in the dynamic sealing between the plunger and the packing component inner wall (at 11 of FIG. 4, for example) as the plunger reciprocates as it is driven by the power end (left of FIG. 4).

The preset distance value may be an empirical value or a numerical value obtained by multiple tests.

In the example implementation above, an original structure of the hydraulic end need not be changed, and the pressure sensor 4 is arranged at or near the original grease injection hole 6 configured to connect the automatic lubrication system 7 to detect the pressure value inside the hydraulic end of the plunger pump 3. The structure is simple, and the overhaul is facilitated.

In a specific embodiment, as shown in FIG. 4, the packing leakage detection system further includes a one-way valve 8, a three-way joint 9 and a straight joint 10.

An input end of the grease injection hole 6 is connected to the automatic lubrication system 7, an output end of the grease injection hole 6 is connected to a first end of the one-way valve 8, a second end of the one-way valve 8 is connected to a first end of the three-way joint 9, a second end of the three-way joint 9 is connected to a first end of the pressure sensor 4, a second end of the pressure sensor 4 is connected to the control system 5, a third end of the three-way joint 9 is connected to a first end of the straight joint 10, and a second end of the straight joint 10 is connected to a packing component 11 of the hydraulic end.

Through the reciprocating motion of a plunger 12, the plunger pump converts a low-pressure mixed solution entering from a liquid inlet end into a high-pressure mixed solution to be discharged. In this process, the packing component 11 and the plunger 12 are dynamically sealed, and the sealing is achieved by virtue of radial expansion of the packing component 11. A packing gland nut 14 is configured to maintain the sealing performance of the packing component 11.

The second end of the pressure sensor 4 is connected to the control system 5 through a cable 13.

By connecting the second end of the three-way joint 9 to the first end of the pressure sensor 4, the pressure sensor 4 can detect a pressure value of a contact part between packing component 11 and the plunger 12 inside the hydraulic end. Specifically, such contact part should dynamically seal between the wall of the packing component 11 and the plunger 12 under normal operations. As such, the lubrication line along the lubrication grease/oil injection hole, the one-way valve 8, the three-way joint 9, and the pressure sensor 4 (alternatively referred to as the lubricating side (or lubricating cavity) of the plunger in the hydraulic end 1) should be sealed against and hydraulically separate from the valve box containing the fracturing fluid (alternatively referred to as fracturing fluid end, or front cavity side of the plunger in the hydraulic end 1). The pressure value measured by the pressure sensor 4 would not be affected by the pressure at the front cavity side under normal operations. However, in case of sealing failure or leakage between the inner wall of the packing component 11 and the plunger 12, the lubricating side and the frond end side of the plunger would be hydraulically connected through the failed sealing, and the pressure sensor 4 would then read at least partially the pressure from the front end side, which would be different from the pressure in the lubricating side without sealing failure or leakage of the packing component, thereby providing a mechanism for leakage detection.

For example, when the automatic lubrication system 7 injects lubricating grease under normal operations, the pressure is about 20 MPa on the lubricating side (e.g., within the fluid path of 8, 4, 9, and 10 of FIG. 4), indicating that the contact part between the packing component 11 and the plunger 12 is a pressure cavity for lubricant grease without leaking from or to the fracturing fluid (the fracturing fluid side or frond cavity side, right side of the plunger 12 of FIG. 4). When the sealing of the packing fails, however, the high pressure inside the front cavity of the hydraulic end (fracturing fluid side, e.g., right side of the plunger 12 of FIG. 4) will reach the lubrication grease pressure cavity (the lubricating side) along the direction of the arrow, that is, from right to left. Due to the fact that the pressure inside the front cavity of the hydraulic end is much higher than the pressure in the lubrication grease line when the automatic lubrication system 7 injects the lubricating grease at this time, the pressure in the lubricating cavity will exhibit high pressure (e.g., higher than the normal, e.g., 20 MPa). As a result, the pressure sensor 4 detects a pressure value and transmits the detected pressure value to the control system 5, and the control system 5 provides prompt information, where the prompt information includes at least one of alarm information and information for prompting shutdown and overhaul.

In some example implementations, at least one grease injection hole 6 is provided, and at least one pressure sensor 4 is provided. More pressure sensors can be employed to detect a more accurate pressure value and can further prompt a user of the leakage anomaly caused by the packing failure in time to overhaul in time, thereby avoiding major safety accidents and effectively preventing a valve box from being damaged due to leakage and achieving good economy.

In FIG. 4, an entire packing leakage detection system including the one-way valve 8, the three-way joint 9, the pressure sensor 4, the cable 13, the control system 5 and the straight joint 10 is connected between the space above the packing component 11 and the grease injection hole 6. Only one set of pressure sensor 4, the cable 13 and the control system 5 are shown in the space above the packing component 11, merely as an example. In some implementations, another grease injection hole 6 may also be arranged on a housing of a hydraulic end below the packing component 11, either as alternative or addition. An entire packing leakage detection system including the one-way valve 8, the three-way joint 9, the pressure sensor 4, the cable 13, the control system 5 and the straight joint 10 may be connected between the space below the packing component 11 and the another grease injection hole 6. FIG. 4 shows a situation that two pressure sensors 4 are arranged. According to the position distribution of the grease injection hole 6, the pressure sensor 4 may also be arranged in another position. Multiple set of pressure sensors and grease injections holes may be arranged.

In a specific example embodiment, a connecting hole may be arranged in a circumferential position of the grease injection hole 6, and the pressure sensor 4 is arranged on the connecting hole.

In some example implementations, a new connecting hole may be formed in the circumferential position of the grease injection hole 6, and the pressure sensor 4 may be connected to the connecting hole. An original structure of the hydraulic end need not be changed, and the pressure sensor 4 may be arranged by the original grease injection hole 6 configured to connect the automatic lubrication system 7 to detect the pressure value inside the hydraulic end of the plunger pump 3. The structure is simple, and an overhaul or stoppage in case of packing leakage is facilitated.

At least one grease injection hole 6 may be provided, and likewise, at least one pressure sensor 4 may be provided. More pressure sensors can detect a more accurate pressure value and can further prompt a user of the leakage anomaly caused by the packing failure in time to overhaul in time, thereby avoiding major safety accidents and effectively preventing the valve box from being damaged due to leakage to achieve good economy.

In a specific example embodiment, the control system 5 is specifically configured to judge whether a pressure value is greater than a preset pressure value. In a case that the pressure value is greater than the preset pressure value, prompt information is sent, where the prompt information includes at least one of alarm information and information for prompting shutdown and overhaul.

The preset pressure value may be an empirical value or a numerical value obtained by multiple tests. The preset pressure value may relate to a threshold level of the leakage and the operational pressure in the valve box. The preset pressure value is used as a threshold for indicating a leakage anomaly caused by a packing failure. When the pressure value is greater than the preset pressure value, it indicates that a leakage anomaly caused by a packing failure may have occurred. At this time, prompt information may be generated and sent to give an alarm or prompt shutdown and overhaul to prompt a user of the leakage anomaly caused by the packing failure in time to overhaul in time, thereby avoiding major safety accidents and effectively preventing the valve box from being damaged due to leakage to solve the problem of delayed detection/warning of abnormal packing leakage or other failures. In some other implementations, the threshold value may be programmable. It may be adjusted during the operation life of the plunger pump. It may be adjusted according to the pressure in the valve box measured or detected by other pressure sensors.

Figure 5:
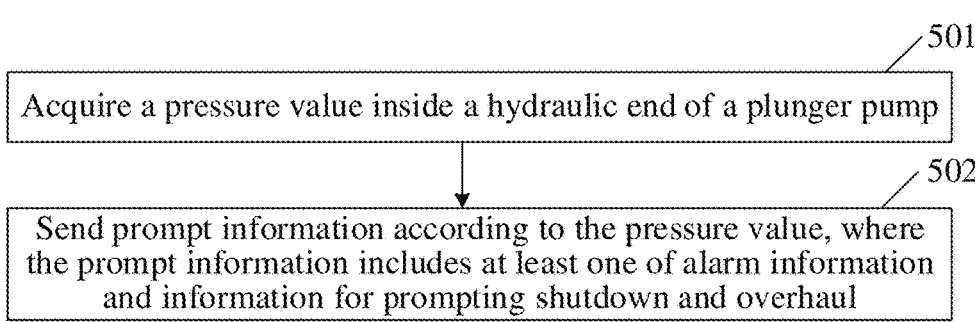
FIG. 5 is a schematic flowchart of a packing leakage detection method in an embodiment of this application.

Based on the same concept, as shown in FIG. 5, an embodiment of this application provides a packing leakage detection method applied to a control system 5. The packing leakage detection method mainly includes the following processes:

Step 501: A pressure value inside a hydraulic end of a plunger pump is acquired.

The acquisition of the pressure value inside the hydraulic end of the plunger pump (in the lubricating side, or lubricating cavity, in particular) may be acquisition of a pressure value sent by a pressure sensor 4.

In a specific embodiment, after the pressure value inside the hydraulic end of the plunger pump is acquired, the packing leakage detection method further includes: the pressure value is recorded.

By recording the pressure value in real time, the pressure change after leakage at the packing can be recorded.

In a specific embodiment, after the pressure value is recorded, the packing leakage detection method further includes: the pressure value is displayed.

After the pressure value is recorded, the pressure value is displayed, so that the pressure change after leakage at the packing can be visually presented accurately and precisely.

Step 502: Prompt information is sent according to the pressure value, where the prompt information includes at least one of alarm information and information for prompting shutdown and overhaul.

In a specific embodiment, prompt information is sent according to a pressure value, including: whether the pressure value is greater than a preset pressure value is judged; and in a case that the pressure value is greater than the preset pressure value, the prompt information is sent.

The preset pressure value may be an empirical value or a numerical value obtained by multiple tests. The preset pressure value is used for indicating a leakage anomaly caused by a packing failure. When the pressure value is greater than the preset pressure value, it indicates that a leakage anomaly caused by a packing failure may have occurred. At this time, prompt information is sent to give an alarm or prompt shutdown and overhaul to prompt a user of the leakage anomaly caused by the packing failure in time to overhaul in time, thus avoiding major safety accidents and effectively preventing a valve box from being damaged due to leakage to solve the problem of delayed detection/warning of abnormal packing leakage or other failures.

After receiving the prompt information, the user can stop the operation of the plunger pump for overhaul. After the overhaul is completed and the plunger pump returns to normal, the plunger pump continues to operate under load, and then, the pressure sensor continues to detect the pressure value inside the hydraulic end of the plunger pump to continue to perform the processes of the packing leakage detection method.

Figure 6:
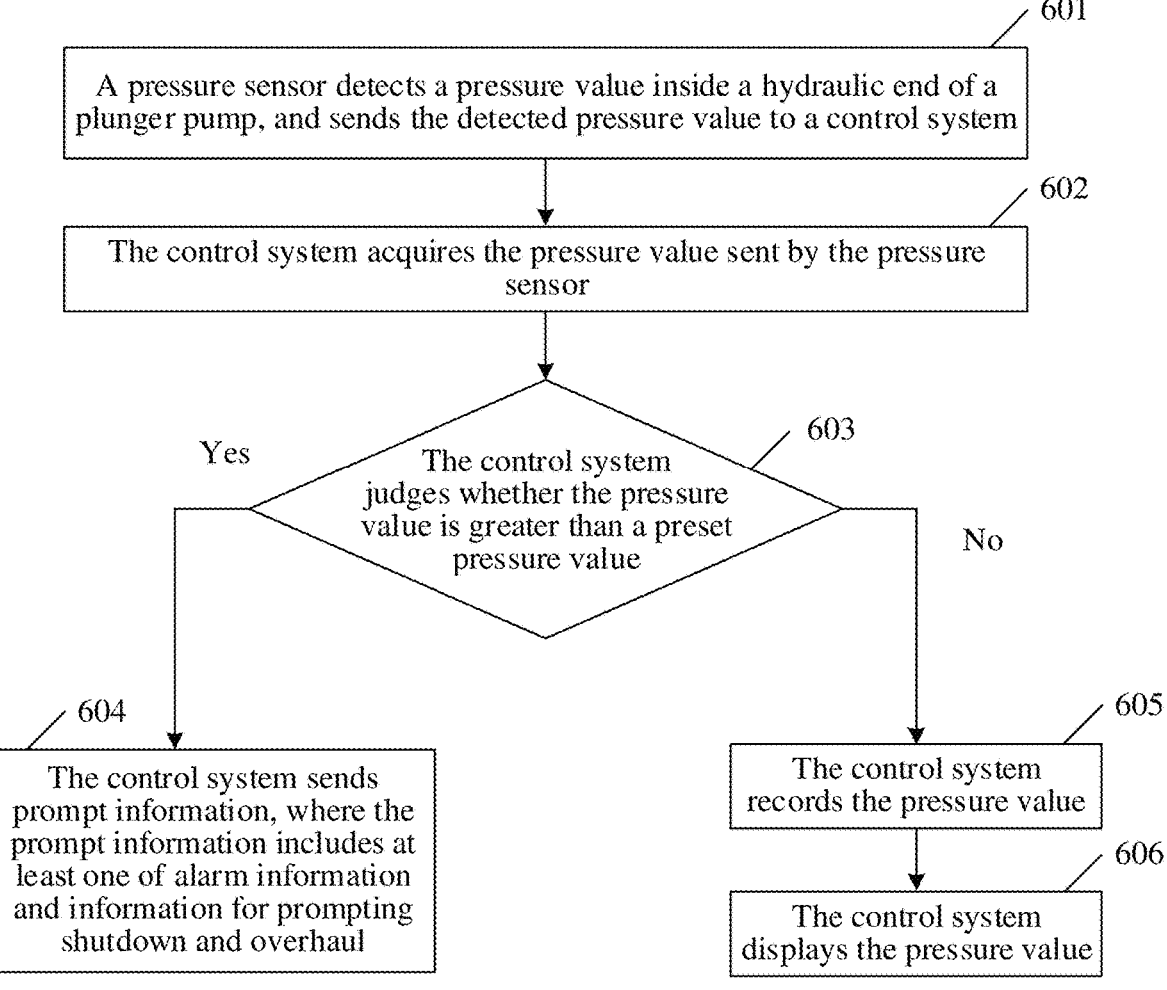
FIG. 6 is a schematic flowchart of the packing leakage detection method in a specific embodiment of this application.

In a specific embodiment, as shown in FIG. 6, a packing leakage detection method includes the following processes:

Step 601: A pressure sensor detects a pressure value inside a hydraulic end of a plunger pump (in the lubricating side, or lubricating cavity, in particular), and sends the detected pressure value to a control system.

Step 602: The control system acquires the pressure value sent by the pressure sensor.

Step 603: The control system judges whether the pressure value is greater than a preset pressure value, where in a case that the pressure value is greater than the preset pressure value, step 604 is performed, otherwise, step 605 is performed.

Step 604: The control system sends prompt information, where the prompt information includes at least one of alarm information and information for prompting shutdown and overhaul.

Step 605: The control system records the pressure value.

Step 606: The control system displays the pressure value.

In this application, the pressure value inside the hydraulic end of the plunger pump is detected through the pressure sensor, the pressure value can reflect a leakage anomaly caused by a packing failure in time, and the prompt information is sent according to the pressure value through the control system to prompt a user of the leakage anomaly caused by the packing failure in time to overhaul in time, thus avoiding major safety accidents and effectively preventing a valve box from being damaged due to leakage to solve the problem of delayed detection/warning of abnormal packing leakage or other failures.

Figure 7:
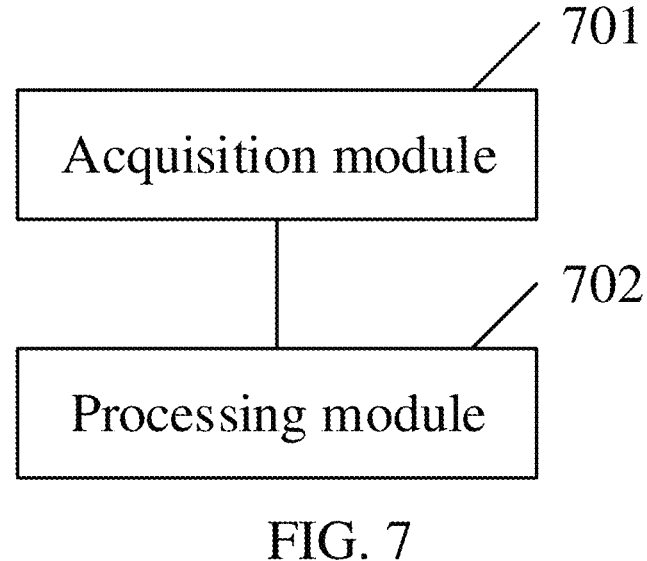
FIG. 7 is a schematic structural diagram of a packing leakage detection apparatus in an embodiment of this application.

Based on the same concept, an embodiment of this application provides a packing leakage detection apparatus. The specific implementations of the apparatus can refer to the descriptions of method embodiments, and the repeated content will not be described. As shown in FIG. 7, the apparatus mainly includes:

an acquisition module 701, configured to acquire a pressure value inside a hydraulic end of a plunger pump; and a processing module 702, configured to send prompt information according to the pressure value, where the prompt information includes at least one of alarm information and information for prompting shutdown and overhaul.

Optionally, the processing module includes:

a first processing sub-module, configured to judge whether the pressure value is greater than a preset pressure value; and a second processing sub-module, configured to send the prompt information in a case that the pressure value is greater than the preset pressure value.

Optionally, the packing leakage detection apparatus further includes:

a recording module, configured to record the pressure value.

Optionally, the packing leakage detection apparatus further includes:

a display module, configured to display the pressure value.

Figure 8:
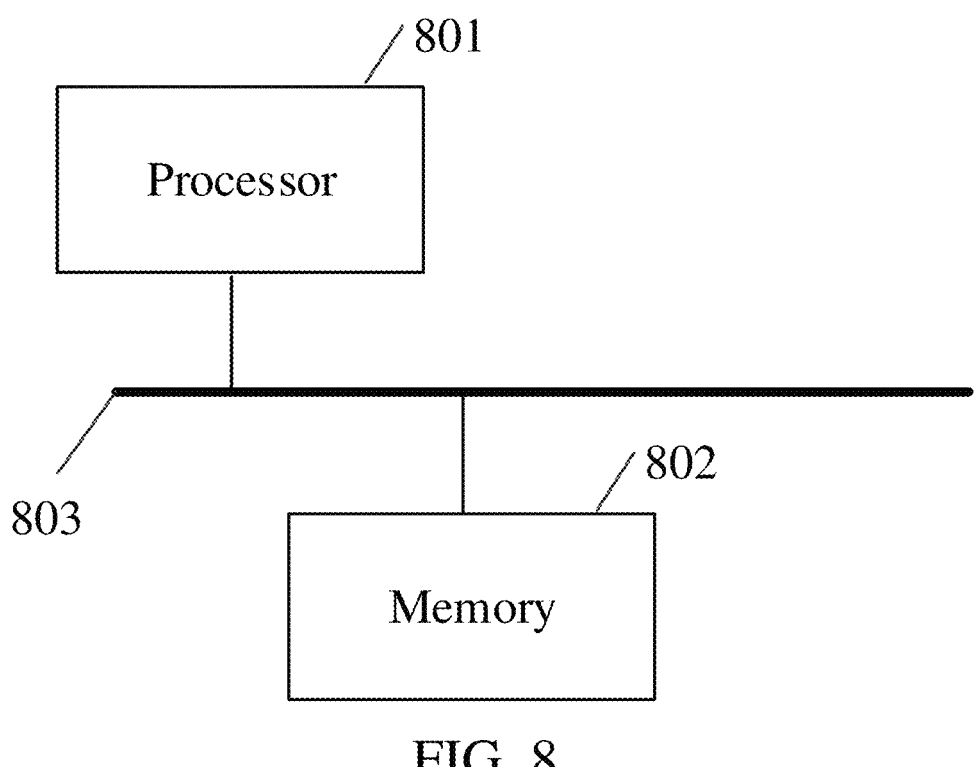
FIG. 8 is a schematic structural diagram of an electronic device in an embodiment of this application.

Based on the concepts and principles above, an embodiment of this application further provides an electronic device. As shown in FIG. 8, the electronic device mainly includes: a processor 801, a memory 802 and a communication bus 803, where the processor 801 and the memory 802 communicate with each other through the communication bus 803. The memory 802 stores a program capable of being executed by the processor 801, and the processor 801 executes the program stored in the memory 802 to implement the following steps:

a pressure value inside a hydraulic end of a plunger pump is acquired; and prompt information is sent according to the pressure value, where the prompt information includes at least one of alarm information and information for prompting shutdown and overhaul.

The communication bus 803 mentioned in the above electronic device may be a peripheral component interconnect (PCI) bus, an extended industry standard architecture (EISA) bus, or the like. The communication bus 803 may be classified as an address bus, a data bus, a control bus, or the like. For ease of representation, only one thick line is used in FIG. 8, but it does not mean that there is only one bus or one type of bus.

The memory 802 may include a random access memory (RAM) or a non-volatile memory, for example, at least one magnetic disk memory. Optionally, the memory may also be at least one storage apparatus located away from the above processor 801.

The above processor 801 may be a general-purpose processor, including a central processing unit (CPU), a network processor (NP), or the like, and may also be a digital signal processor (DSP), an application specific integrated circuit (ASIC), a field-programmable gate array (FPGA), or other programmable logic devices, discrete gate or transistor logic devices and discrete hardware components.

In another embodiment of this application, a computer-readable storage medium is further provided. The computer-readable storage medium stores a computer program. When the computer program is executed on a computer, the computer executes the packing leakage detection method described in the above embodiment.

In the above embodiment, it can be fully or partially implemented through software, hardware, firmware, or any combination thereof. When implemented using software, it can be fully or partially implemented in the form of a computer program product. The computer program product includes one or a plurality of computer instructions. When the computer instruction is loaded and executed on the computer, all or part of the processes or functions described in the embodiments of this application are generated. The computer may be a general-purpose computer, a special-purpose computer, a computer network, or other programmable devices. The computer instruction may be stored in a computer-readable storage medium, or transmitted from one computer-readable storage medium to another computer-readable storage medium. For example, the computer instruction is transmitted from one website, computer, server or data center via wired (such as coaxial cable, optical fiber and digital subscriber line (DSL)) or wireless (such as infrared and microwave) modes to another website, computer, server or data center. The computer-readable storage medium may be any available medium that the computer can access, or a data storage device such as a server or a data center that integrates one or a plurality of available media. The available medium may be a magnetic medium (such as a floppy disk, a hard disk or a magnetic tape), an optical medium (such as a DVD), a semiconductor medium (such as a solid state disk), or the like.

It should be noted that in the description of this application, orientation or position relationships indicated by the terms such as "transverse", "longitudinal", "above", "below", "front", "rear", "left", "right", "vertical", "horizontal", "top", "bottom", "inside" and "outside" are based on orientation or position relationships shown in the accompanying drawings, and are only for the convenience of describing this application and simplifying the description, rather than indicating or implying that the mentioned apparatus or component needs to have a specific orientation or needs to be constructed and operated in a specific orientation. Therefore, this should not be understood as a limitation on this application.

It should be noted that the relational terms herein such as "first" and "second" are used only to differentiate an entity or operation from another entity or operation, and do not require or imply any actual relationship or sequence between these entities or operations. Moreover, the terms "include," "comprise," and any variation thereof are intended to cover a non-exclusive inclusion. Therefore, a process, method, article or device including a series of elements includes not only those elements, but also other elements that are not explicitly listed, or further includes elements inherent to such process, method, article or device. If no more limitations are made, an element limited by "include one . . . " does not exclude other same elements existing in the process, method, article or device which includes the element.

The above descriptions are only specific implementations of the present invention to ensure that a person skilled in the art can understand or implement the present invention. Various modifications to these embodiments are obvious to a person skilled in the art, and the general principles defined in the present invention may be implemented in other embodiments without departing from the spirit or scope of the present invention. Therefore, the present invention is not limited to these embodiments illustrated herein, but conforms to the broadest scope consistent with the principles and novel features disclosed in the present invention.

What is claimed is:

1. A packing leakage detection system, comprising:

a plunger pump comprising a hydraulic end assembly, the hydraulic end assembly comprising a plunger, a lubricating cavity, and a front end cavity, and a dynamic sealing component that seals between the lubricating cavity and the front end cavity;

a pressure sensor disposed in the lubricating cavity; and a control system electrically connected to the pressure sensor, wherein:

the pressure sensor is configured to detect a pressure value inside the lubricating cavity and send the detected pressure value to the control system; and the control system is configured to acquire the pressure value sent by the pressure sensor, and send prompt information according to the pressure value, the prompt information comprising at least one of alarm information and information for prompting shutdown or overhaul of the plunger pump by determining whether the pressure value is greater than a threshold pressure value, and sending the prompt information when the pressure value is greater than the threshold pressure value, the threshold pressure value being programable according to at least a sensed operating pressure in the front end cavity.

2. The packing leakage detection system according to claim 1, wherein:

the pressure sensor is arranged within a preset area with a distance from a grease injection hole from the lubricating cavity to the dynamic sealing component being less than a preset distance value.

3. The packing leakage detection system according to claim 2, wherein:

the grease injection hole is located on a housing of the hydraulic end assembly and configured to connect to an automatic lubrication system through the lubricating cavity.

4. The packing leakage detection system according to claim 3, wherein:

the packing leakage detection system further comprises a one-way valve, a three-way joint and a straight joint; and an input end of the grease injection hole is connected to the automatic lubrication system;

an output end of the grease injection hole is connected to a first end of the one-way valve;

a second end of the one-way valve is connected to a first end of the three-way joint;

a second end of the three-way joint is connected to a first end of the pressure sensor;

a second end of the pressure sensor is connected to the control system;

a third end of the three-way joint is connected to a first end of the straight joint; and a second end of the straight joint is connected to the dynamic sealing component of the hydraulic end assembly.

5. The packing leakage detection system according to claim 3, wherein a connecting hole is arranged in a circumferential position of the grease injection hole, and the pressure sensor is arranged on the connecting hole.

6. The packing leakage detection system according to claim 3, wherein at least one grease injection hole is provided, and at least one pressure sensor is provided.

7. The packing leakage detection system according to claim 3, wherein at least two grease injection holes are provided, and at least two pressure sensors are provided.

8. A packing leakage detection method, comprising:

acquiring a pressure value inside a lubricating cavity of a hydraulic end assembly of a plunger pump, the hydraulic end assembly comprising a plunger, the lubricating cavity, and a front end cavity, and a dynamic sealing component that seals between the lubricating cavity and the front end cavity; and sending prompt information according to the pressure value, wherein the prompt information comprises at least one of alarm information and information for prompting shutdown and overhaul of the plunger pump and is sent when the pressure value is greater than a threshold pressure value, the threshold pressure value being programable according to at least a sensed operating pressure in the front end cavity.

9. The packing leakage detection method according to claim 8, wherein after acquiring the pressure value inside the lubricating cavity, the method further comprises:

recording the pressure value.

10. The packing leakage detection method according to claim 9, wherein after recording the pressure value, the method further comprises:

displaying the pressure value.

* * * * *